(12) United States Patent
Monteil et al.

(10) Patent No.: US 11,574,377 B2
(45) Date of Patent: Feb. 7, 2023

(54) INTELLIGENT ON-DEMAND MANAGEMENT OF RIDE SHARING IN A TRANSPORTATION SYSTEM

(71) Applicant: INTERNATIONAL BUSINESS MACHINES CORPORATION, Armonk, NY (US)

(72) Inventors: Julien Monteil, Dublin (IE); Claudio Gambella, Dublin (IE); Andrea Simonetto, Celbridge (IE); Yassine Lassoued, Dublin (IE); Anton Dekusar, Castleknock (IE); Martin Mevissen, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 16/429,273

(22) Filed: Jun. 3, 2019

(65) Prior Publication Data
US 2020/0380629 A1 Dec. 3, 2020

(51) Int. Cl.
*G06Q 50/30* (2012.01)
*G06Q 10/06* (2012.01)

(52) U.S. Cl.
CPC ........... *G06Q 50/30* (2013.01); *G06Q 10/067* (2013.01); *G06Q 10/06315* (2013.01)

(58) Field of Classification Search
CPC .......................... G06Q 50/30; G06Q 10/06315
See application file for complete search history.

(56) References Cited

U.S. PATENT DOCUMENTS

| | | | |
|---|---|---|---|
| 10,157,396 B1 | 12/2018 | Phillips et al. | |
| 10,837,786 B2 * | 11/2020 | Tian | G06Q 50/30 |
| 2011/0246404 A1 * | 10/2011 | Lehmann | G06Q 50/14 |
| | | | 706/21 |
| 2012/0078672 A1 * | 3/2012 | Mohebbi | G06Q 10/0631 |
| | | | 705/7.12 |
| 2015/0242944 A1 * | 8/2015 | Willard | G06Q 30/0284 |
| | | | 705/5 |
| 2016/0104111 A1 * | 4/2016 | Jones | G06Q 10/0835 |
| | | | 705/26.4 |
| 2017/0024393 A1 * | 1/2017 | Choksi | G06F 16/24578 |
| 2017/0228683 A1 | 8/2017 | Hu et al. | |

(Continued)

OTHER PUBLICATIONS

Andrea Simonetto et al, Real-time city-scale ridesharing via linear assignment problems, Transportation Research Part C: Emerging Technologies vol. 101, Apr. 2019, pp. 208-232 (Year: 2019).*

(Continued)

*Primary Examiner* — Andre D Boyce
(74) *Attorney, Agent, or Firm* — Griffiths & Seaton PLLC

(57) ABSTRACT

Embodiments for providing intelligent transportation service management in a transportation system by a processor. Transportation service requests may be assigned amongst multiple transportation service providers according to one or more transportation service request distribution models and various parameters and preferences for each user. The transportation service request distribution models may protect information relation to each of the transportation service providers and suggests a selected order for distributing the plurality of transportation service requests.

20 Claims, 8 Drawing Sheets

(56) References Cited

U.S. PATENT DOCUMENTS

| | | | |
|---|---|---|---|
| 2017/0293950 A1 | 10/2017 | Rathod | |
| 2017/0357914 A1* | 12/2017 | Tulabandhula | H04W 4/025 |
| 2017/0372235 A1* | 12/2017 | Dayama | G06Q 10/02 |
| 2018/0101801 A1 | 4/2018 | Renteria et al. | |
| 2018/0349849 A1* | 12/2018 | Jones | G06Q 10/0838 |
| 2018/0350023 A1* | 12/2018 | Devries | G06Q 10/02 |
| 2019/0156253 A1* | 5/2019 | Malyack | G06Q 10/0833 |
| 2019/0311629 A1* | 10/2019 | Sierra | G06Q 10/02 |
| 2019/0340543 A1* | 11/2019 | Gerenstein | G06Q 30/0205 |
| 2020/0005206 A1* | 1/2020 | van Ryzin | G06Q 10/06311 |
| 2020/0039645 A1* | 2/2020 | Soryal | B64C 39/024 |
| 2020/0104962 A1* | 4/2020 | Aich | G06Q 50/30 |
| 2020/0151624 A1* | 5/2020 | Sierra | G06Q 10/02 |
| 2020/0300644 A1* | 9/2020 | Tian | H04L 63/105 |
| 2020/0309557 A1* | 10/2020 | Efland | G06K 9/00671 |
| 2020/0342418 A1* | 10/2020 | Zatta | B60S 5/00 |
| 2021/0075792 A1* | 3/2021 | Tian | G01C 21/3691 |

OTHER PUBLICATIONS

Jintao Ke et al, Short-term forecasting of passenger demand under on-demand ride services: A spatio-temporal deep learning approach, Transportation Research Part C 85 (2017) 591-608 (Year: 2017).*

\* cited by examiner

INTELLIGENT ON-DEMAND MANAGEMENT OF RIDE SHARING IN A TRANSPORTATION SYSTEM

BACKGROUND OF THE INVENTION

Field of the Invention

The present invention relates in general to computing systems, and more particularly to, various embodiments for intelligent on-demand management of ride sharing in a transportation system by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products.

As great strides and advances in technologies come to fruition, these technological advances can be then brought to bear in everyday life. For example, the vast amount of available data made possible by computing and networking technologies may then assist in improvements to transportation.

SUMMARY OF THE INVENTION

Various embodiments for intelligent on-demand management of ride sharing in a transportation system by a processor, are provided. In one embodiment, by way of example only, a method for providing intelligent on-demand management of ride sharing in a transportation system by a processor is provided. Transportation service requests may be assigned amongst multiple transportation service providers according to one or more transportation service request distribution models and various parameters and preferences for each user. The transportation service request distribution models may protect information in relation to each of the transportation service providers and suggest a selected order for distributing the plurality of transportation service requests.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
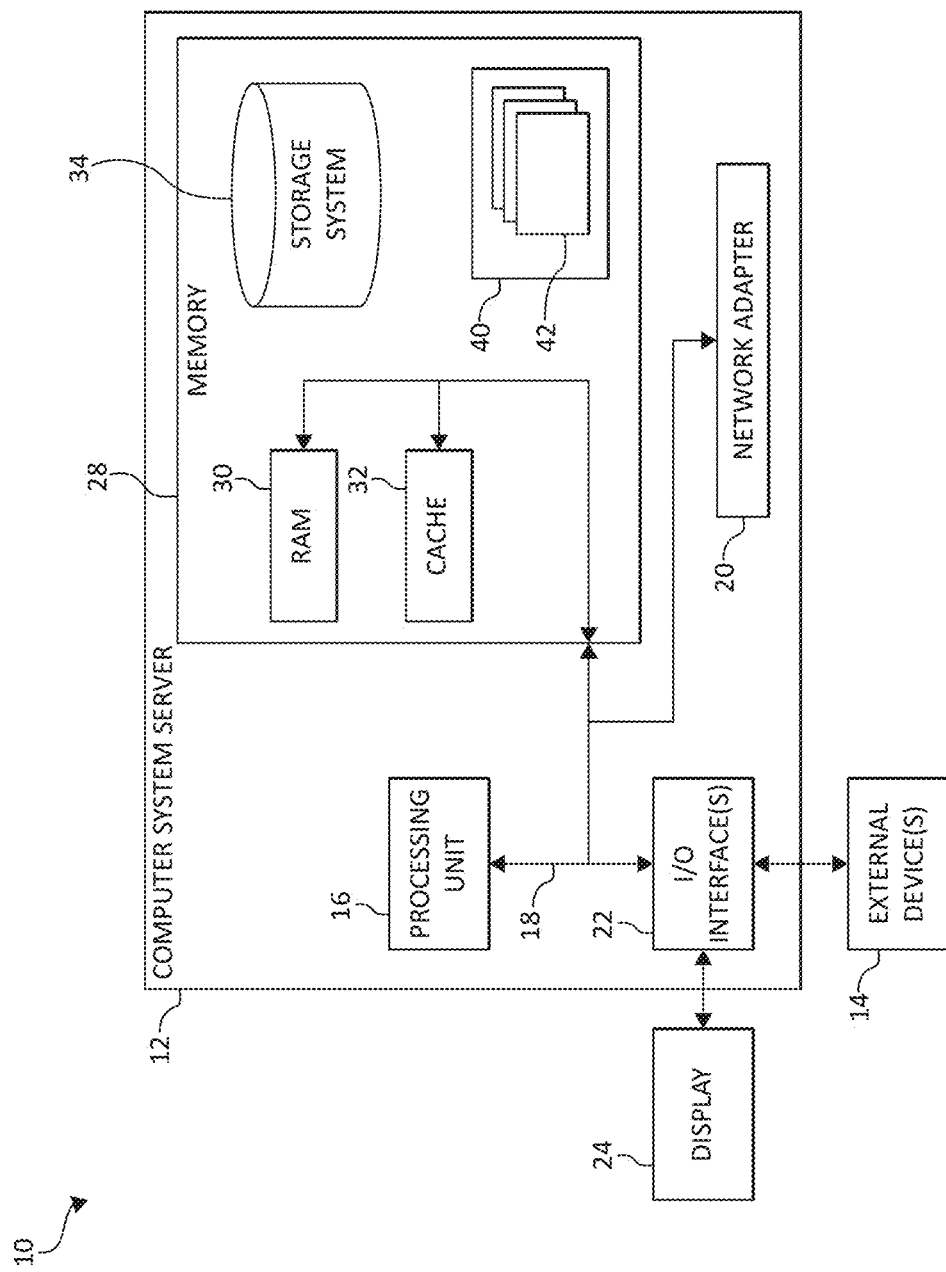
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

The prolific increase in use of IoT appliances in computing systems, particularly within the cloud computing environment, in a variety of settings provide various beneficial uses to a user. Various IoT appliances may be used for personal use, such as travel or exercise, while also using the IoT appliances within various types of vehicles or navigation systems for travel. For example, many individuals arrange for travel using taxis or other ride sharing services for commuting from one place to another. Accordingly, one or more IoT devices may be used to order a transportation service (e.g., a vehicle-for-hire and/or ride-sharing service) to assist with travel and rapid mobility to one or more desired destinations.

A vehicle-for-hire is a vehicle, such as an automobile, that is driven by a professional driver or a self-driving vehicle (e.g., an autonomous vehicle), whose job it is to pick up one or more passengers and transport them to a desired destination that is provided by the passengers. One common example of a vehicle-for-hire is a taxicab, also known as a "taxi." In some regions, a distinction is made between a taxi, which is permitted to pick up passengers who hail the taxi as it drives, and a car service, for which pickup locations and times are prearranged. However, in most other regions, automobiles acting as vehicles for hire are referred to as taxis regardless of whether passenger pickup is prearranged or hailed. A ride-sharing service may be a peer-to-peer ride sharing service or a ride sharing services that arranges shared rides, carpooling or car sharing service. In one aspect, a vehicle may be an automobile, bicycle, motorcycle, boat, ship, train, plane/aircraft, autonomous vehicle, off road vehicle, truck, and the like.

With the increasing number and sizes of ride sharing companies along with the competition for the same customers, there is a growing need to manage the competition in an on-demand, but distributed, private and fair fashion. While centralizing coordination may be needed to assign vehicles to users in an optimum way (e.g., in terms of service level), certain entities (e.g., a vehicle for hire service business) may not desire to disclose any proprietary information about their offering strategies or vehicle identifiers ("IDs" or positions. In addition, there is a need to limit the number of operating vehicles for each company in an optimized and fair manner. If the resources are not limited, then congestion, pollution, design and management costs may grow uncontrollably.

Accordingly, the present invention provides a system for intelligently ensuring a high-service rate of ride sharing requests while limiting the number of required vehicles in a privacy-aware and fair way. In one aspect, mechanisms of the illustrated embodiments provide for intelligent on-demand management of ride sharing in a transportation system. Transportation service requests may be assigned, via a transportation system broker (e.g., a ride sharing broker) amongst multiple transportation service providers according to one or more transportation service request distribution models and various parameters and preferences for each user. The transportation service request distribution models may protect information relating to each of the transportation service providers and suggests a selected order for distributing the plurality of transportation service requests.

In an additional aspect, the present invention provides a solution for the vehicle-customer assignment problem (e.g., linear assignment problem "LAP") by processing ride sharing requests (e.g., transportation service requests) in batches over a selected time period (e.g., during a defined time windows) and in a distributed/selected order and optimally allocating one or more ride sharing request to one or more available vehicles. A distributed auction operation (or distributed auction algorithm) may be applied to ensure a ride sharing broker of the present invention is not required to obtain complete/full access to entity proprietary information. The distributed auction operation may require that each transportation service provider to communicate only the bids of their vehicles, which disclose the two best prices for the yet unassigned customers. The distributed auction operation does not require the companies to fully disclose proprietary information with the broker. Thus, instead of obtaining all the information about the ride sharing service provider fleets and their pricing strategy, the ride sharing broker sends the requests to the ride sharing services and obtains the top k offerings. That is, the ride sharing broker only requires k best/optimal costs (where k is equal to or greater than 2 such as, for example, k≥2), or the k best/optimal costs differences at each iteration of the distributed auction operation. In one aspect, the present invention provides for a degree of fairness for a real-time available number of operating vehicles per entity (e.g., a selected number of available transportation service providers per company), which may be used to avoid aggressive or undesired competition between entities competing for market share.

In one aspect, the distributed auction operation (or distributed auction algorithm) may be applied as follows. In a distributed implementation of auction algorithm for assignment, the transportation service providers send to the ride sharing broker each of the bids of each proprietary vehicle on the customers. The distributed auction operation runs iteratively, and unassigned vehicles have to raise their bids, with a lower profit for the transportation service providers. After a finite number of steps, the vehicles reach a condition where there is no incentive for any vehicle to raise its bids. Finally, the broker communicates to the transportation service providers the assignment of vehicles to requests.

In an additional aspect, the present invention provides for the on-demand management of ride sharing using a transportation broker in communication with multiple ride share service providers in a distributed, optimal, privacy aware way while also providing a degree of fairness. The mechanisms of the illustrated embodiments may include the transportation broker that is connected to a number of ride sharing services (e.g., transportation service providers). The transportation broker may receive real-time user transportation requests for a transportation service (e.g., ride sharing). The transportation broker processes the user's transportation requests so as to optimize an assignment of shared transportation provider's vehicles to a user/customer in a privacy-aware and fair way. It should be noted that "optimally" providing an assignment of shared transportation provider's vehicles may include minimizing an overall cost and time for users/customers, maximizing one or more user defined preferences for each of the users/customers, and minimizing the overall cost of operating vehicles (e.g., total number of operating vehicles, driving times, overall fuel consumption, pollution, etc.). Also, providing an assignment of shared transportation provider's vehicles in a "privacy-aware manner may include protecting selected data of relating to each transportation service provider (e.g., each ride sharing company), such as, for example, each vehicle identity and positions. The degree of fairness may include and/or pertain to the transportation broker's market share model vis-à-vis the ride sharing companies (e.g., based on number of licenses paid by companies to broker authority).

In one aspect, the present invention may learn user demand for ride sharing from historical customer request data. User demand for ride sharing may be predicted over a defined time period (e.g., over given time horizon such as, for example, the next several hours). Embodiments of the present invention may estimate a number(s) of vehicles needed to satisfy the predicted user demand over the selected time period (e.g., time horizon of length $\Delta T$ or the length of time horizon for demand prediction) Based on a transportation service request distribution model (e.g., a market share model), the present invention may suggest a minimal and fair number of operating vehicles over the time horizon of $\Delta T$ for each transportation service provider.

The present invention may receive one or more user ride sharing requests with user preferences and process the user ride sharing service requests in batches over a defined, selected, and/or suitable time windows of length $\delta T$ (e.g., the length of the time horizon/selected time for batching ride sharing requests). The ride sharing broker anonymizes those requests (e.g., by anonymizing customer IDs), and submits the anonymized requests to the transportation service providers. For each user request submitted to a transportation service provider, a received response from the transportation service provider may include one or more user-centric cost vectors associated with a pick-up and drop-off location of each of the user requests (e.g., time to pick-up, time to destination, rate, and/or deviation from user preferences). Said differently, for each user ride sharing request batch, a request from the transportation service providers may include one or more user-centric parameters, expressing user location and preferences (e.g., pick-up and delivery time window, maximum ride time or arrival time). Each transportation service provider computes the costs to assign their proprietary vehicles to user requests. Using the cost vectors (e.g., a list of assignment costs of vehicles to customers/users/requests) received from the transportation service providers, the assignment problem may be solved in an optimal and fair way. For example, ride sharing requests may be optimally solved by using the distributed auction algorithms. For fairness in assignment of the ride sharing requests, the distributed auction algorithm may be executed/run offline to determine a minimum number of vehicles to satisfy all requests. Then, in one implementation, the fairness operations caps a number of vehicles per company to the minimum possible. Another implementation is given by pricing adjustment schemes.

Thus, as described herein, the present invention provides for intelligent on-demand management of ride sharing in a multi-transportation service provider environment (e.g., multiple entities/companies). In one aspect, one or more batches of user ride sharing requests for a selected time period (e.g., 10 seconds) may be collected. Each transportation service provider may determine/compute the costs for inserting requests in each vehicle route by solving a dial-a-ride ("DARP") problem with those determined costs are shared with an intelligent transportation service brokering system (see FIGS. 4-6). The intelligent transportation service brokering system provides an optimal solution to a linear assignment problem ("LAP") and sends one or more ride sharing assignments of vehicles to service each ride sharing request. The intelligent transportation service brokering system may use a rebalancing strategy for one or more unserved ride sharing requests. This process is repeated for every batch of requests. In one aspect, the intelligent transportation service brokering system may provide one-to-one assignments of each ride sharing request to vehicles to provide very high service rates in a dynamic context. Thus, the LAP is solved by the intelligent transportation service brokering system, which is solved twice in each sampling period: first, to seek an optimal assignment of requests to available vehicles, and then to rebalance vehicles to satisfy unserved requests, by relaxing one or more preferences (e.g., time preferences) specified in each ride sharing requests.

It should be noted that, as used, herein, the term "ride sharing" may be broadly defined according to those skilled in the art encompassing various types of transportation service providers (e.g., a "ride sharing service") that offer users (e.g., customers/passengers) to travel in private vehicles operated automatically and/or by their owners or drivers of transportation service provider. For example, "ride sharing" may include, but is not limited to, taxi services, car-pooling services, ride sharing services such as, for example, a taxi service, Uber®, Lyft®, etc. A transportation service broker (e.g., ride sharing broker) may also be referred to as "broker" and may be connected to a one or more transportation services (e.g., "ride sharing service"). The transportation service broker may act on behalf of (e.g., represent and/or function as a broker/agent) one or more users to book suitable rides with relevant connected ride sharing services. A degree of fairness ("fairness") may pertain to ride sharing services pay fees/shares to the ride sharing broker such as, for example, when the broker is owned/managed by a public authority, and the car sharing companies pay license fees to the public authority, depending on the number of vehicles to make available. In an additional aspect, the degree of fairness may restrict or "cap" a number of vehicles per transportation service provider depending on the predicted demand. In an alternative aspect, a degree of fairness may be used and/or applied in Mobility as a Service ("MaaS") by using a pricing operation such as, for example, adjusting a price ("price adjustment") to assign/provide penalties to unnecessary vehicles to achieve fairness in the competition setting between one or more transportation service providers.

In such a case, the entity/company vehicles may need to be assigned to one or more users in a fair and appropriate manner. A "transportation service request distribution models" (e.g., a market share model) may be one or more models determining the percentage of total operating fleet to be allocated to each participating transportation service provider and may be proportional to the number of licenses issued by a public entity authority (e.g., governmental agency) to each transportation service provider. Also, protecting information relating to each of the plurality of transportation service providers (e.g., maintaining privacy) may pertain and include protecting selected data (e.g., proprietary data) of transportation services providers (e.g., a "ride sharing service") (e.g., protecting vehicle identities and geographical positions)

It should be noted as described herein, the term "intelligent" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, intelligent or "cognition" may refer to a mental action or process of acquiring knowledge and understanding through thought, experience, and one or more senses using machine learning (which may include using sensor-based devices or other computing systems that include audio or video devices). Intelligent or "cognitive" may also refer to identifying patterns of behavior, leading to a "learning" of one or more events, operations, or processes. Thus, the intelligent model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term intelligent may refer to an intelligent system (e.g., a cognitive system). The intelligent system may be a specialized computer system, or set of computer systems, configured with hardware and/or software logic (in combination with hardware logic upon which the software executes) to emulate human intelligent/cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented artificial intelligence ("AI") operations that approximate a human thought process while enabling a user or a computing system to interact in a more natural manner. An intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the intelligent system may implement the intelligent operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
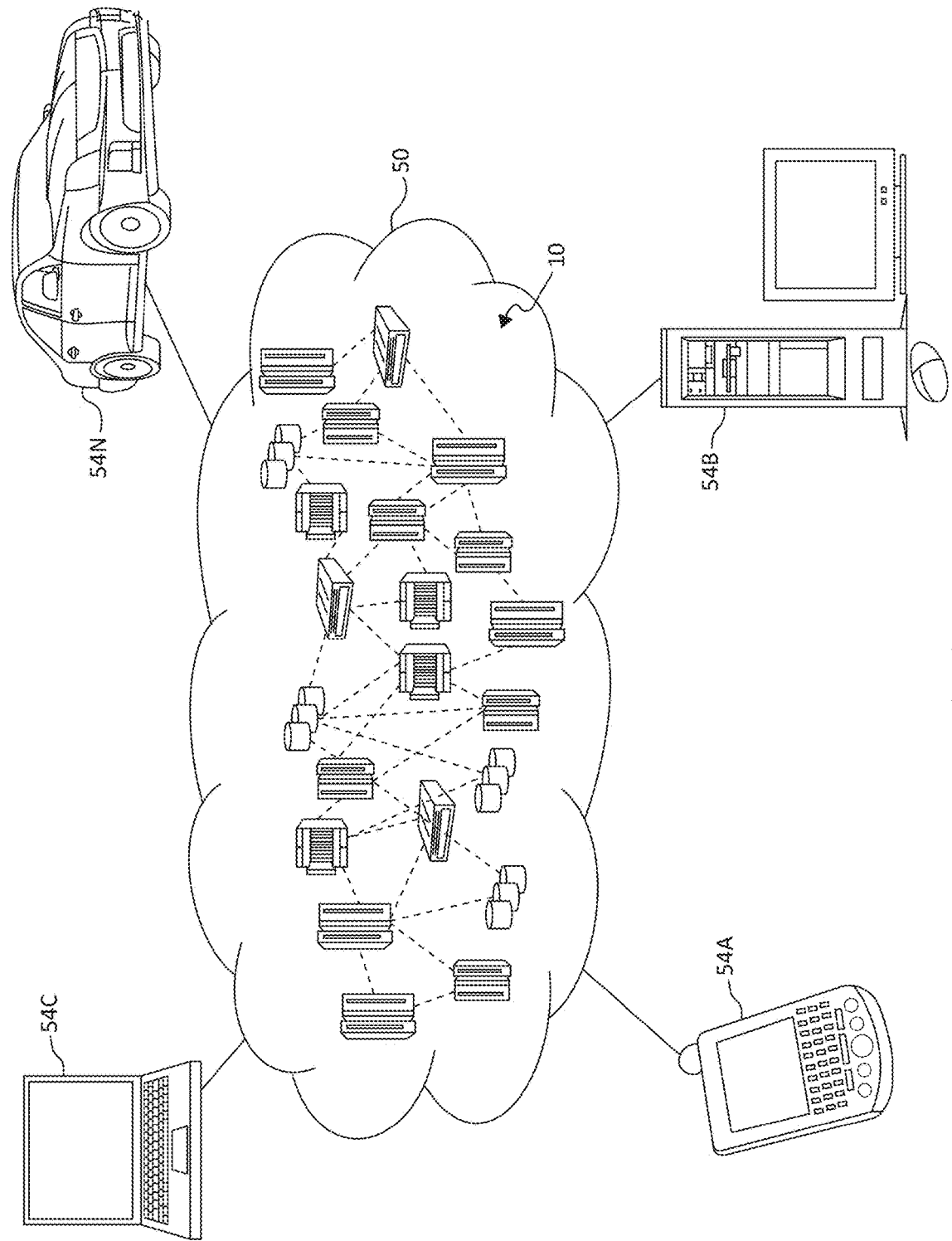
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
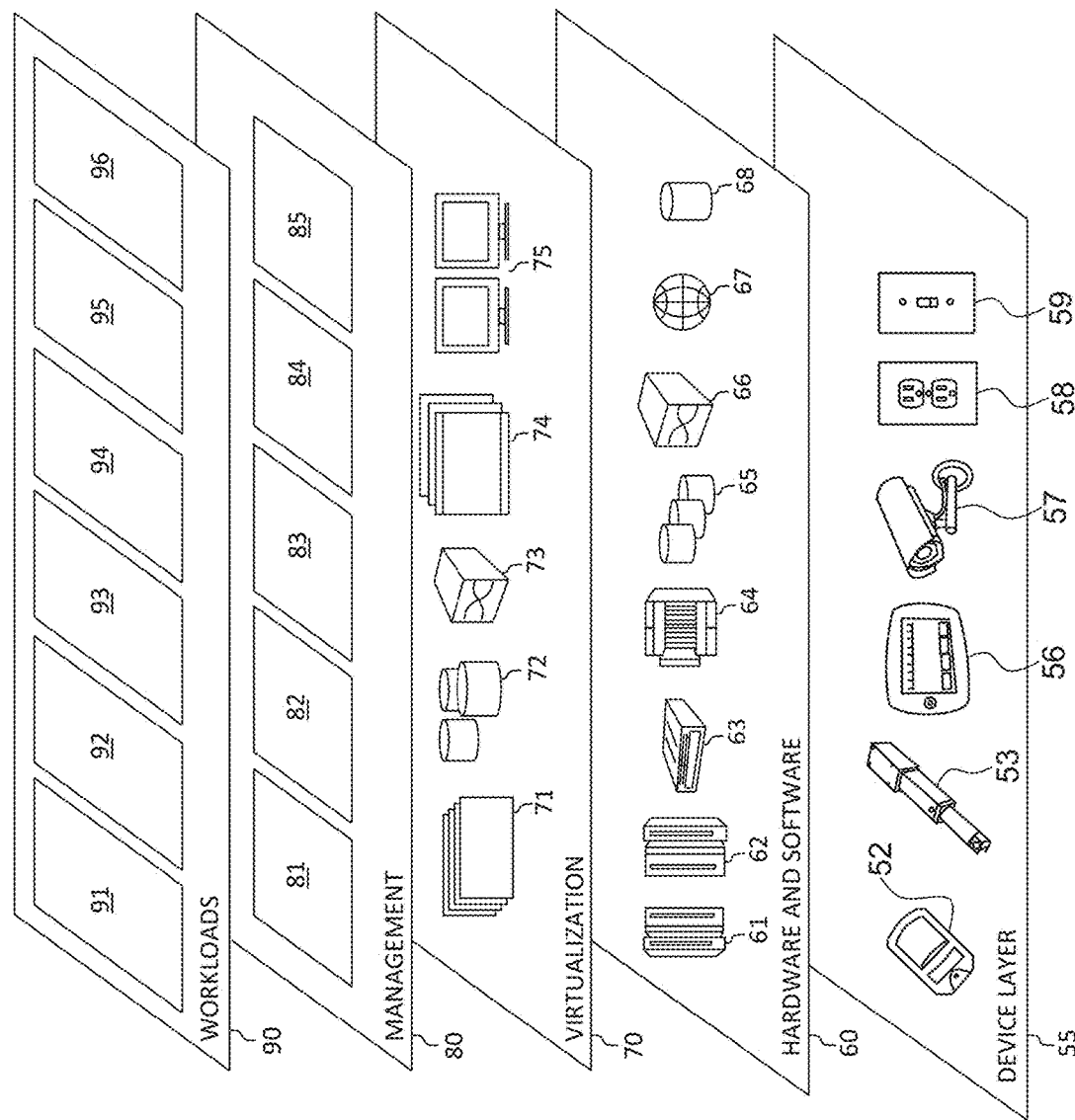
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent on-demand management of ride sharing in a transportation system. In addition, workloads and functions 96 for intelligent on-demand management of ride sharing may include such operations as data analysis (including data collection and processing from various vehicular or environmental sensors), collaborative data analysis, and predictive data analytics functions. One of ordinary skill in the art will appreciate that the workloads and functions 96 for intelligent on-demand management of ride sharing in a transportation system may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for intelligent transportation service management in a transportation system by a processor. Transportation service requests may be assigned amongst multiple transportation service providers according to one or more transportation service request distribution models and various parameters and preferences for each user. The transportation service request distribution models may protect information relating to each of the transportation service providers and suggests a selected order for distributing the plurality of transportation service requests.

In one aspect, the ride sharing service may involve a "trip" or "journey." The so-called "trip" or "journey" may be very subjective and context dependent. A journey may simply be, in a broadest possible meaning, the entire/whole travel experience from a point A to a point B. For example, a journey may encompass an entire travel experience for a user (e.g., commuting from home to work). In a more limiting context, a journey may include one or more actions or movements of traveling from one location to another location. The journey may also include one or more acts, events, decisions, or travel related operations relating to one or more acts of moving from one location to one or more alternative locations. A journey may include each decision, experience, action, and/or movement within and without a vehicle. A journey may include one or more routes and destinations. A journey may also include one or more actions, movements, stops (temporary or permanent), travel information, reservations, transportation options, modes of travel, and/or one or more operations relating to navigation systems, entertainment systems, and/or telecommunication systems.

Figure 4:
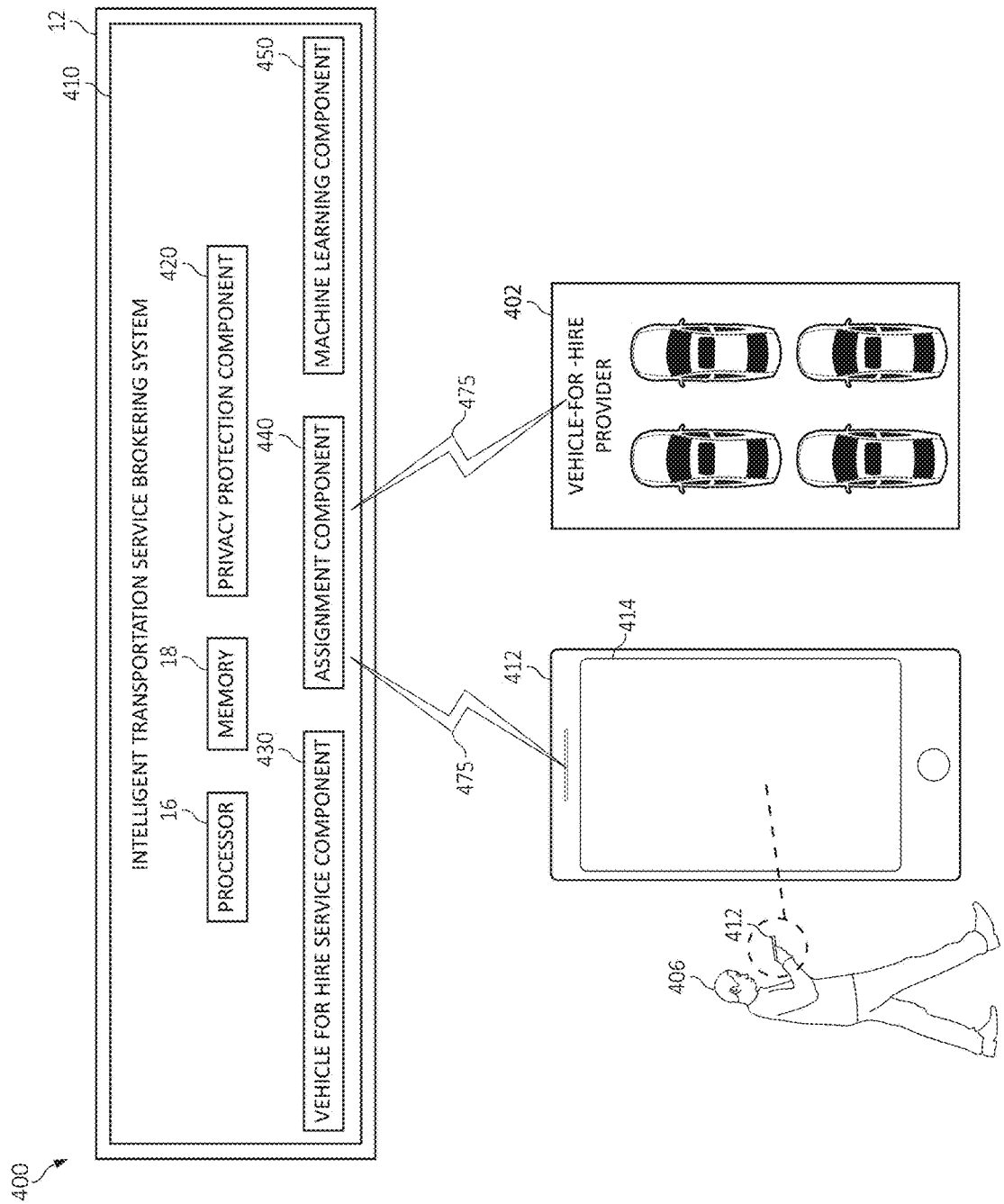
FIG. 4 is a diagram depicting various user hardware and computing components functioning in accordance with aspects of the present invention.

Turning now to FIG. 4, a block diagram depicting exemplary functional components of a system 400 according to various mechanisms of the illustrated embodiments is shown. FIG. 4 illustrates the system 400 providing an intelligent transportation service brokering system 410 in a transportation system/computing environment, according to an example of the present technology.

As will be seen, many of the functional blocks may also be considered "modules" or "components" of functionality, in the same descriptive sense as has been previously described in FIGS. 1-3. For example, computer system/server 12 of FIG. 1 may be included in FIG. 4 and may be connected to other computing nodes (such as computer systems of vehicles or non-vehicle systems such as traffic cameras, cloud computing networks, global positioning satellite ("GPS") devices, vehicle-to-vehicle ("V2V") systems, smartphones, etc., and/or one or more Internet of Things (IoT) devices over a distributed computing network, where additional data collection, processing, analytics, and other functionality may be realized.

In one embodiment, the computer system/server 12 includes an intelligent transportation service brokering system 410 that may be in communication via network or communication link 475 with one or more transportation service providers (e.g., vehicle-for-hire providers) such as, for example, transportation service providers 440 and/or user 406 via one or more user equipment ("UE") 412 (e.g., an IoT device such as a smart phone, computer, tablet, smartwatch, etc.).

In one aspect, the intelligent transportation service brokering system 410 may be an independent computing service provided by one or more computing systems and servers (not shown for illustrative convenience but may be included in one or more components, modules, services, applications, and/or functions of FIGS. 1-4) and external to the transportation service provider 402 and the UE 412.

In an additional embodiment, the intelligent transportation service brokering system 410 may be located and locally installed within a computing system association with the transportation service provider 402 and/or the UE 412. The transportation service provider 402 and the UE 412 may be associated with the intelligent transportation service brokering system 410 via one or more pre-authorization operations and/or may be instantaneously joined to the intelligent transportation service brokering system 410 via a series of authentication operations to join and grant permission to the intelligent transportation service brokering system 410 to gain accesses to one or more IoT devices and/or computing systems of the transportation service provider 402 and UE 412 for requesting a vehicle-for-hire and/or protecting privacy of user 406 in a transportation system/vehicle-for-hire system.

Additionally, the intelligent transportation service brokering system 410 may incorporate processing unit 16 ("processor") and memory 28 of FIG. 1, for example, to perform various computational, data processing and other functionality in accordance with various aspects of the present invention. The intelligent transportation service brokering system 410 may also include a privacy protection component 420, a vehicle-for-hire service component 430 (e.g., ride sharing component), an assignment component 440, and a machine learning component 450, each of which may be controlled and in communication with processing unit 16 and memory 28.

The vehicle-for-hire service component 430 (e.g., a ride sharing service) may enable a user such as, for example, user 406 to order, subscribe, and/or request, and/or dispatch a ride sharing service/vehicle-for-hire (e.g., a taxi, peer-to-peer ride sharing service, etc.). The vehicle-for-hire service component 430 may identify one or more available vehicles for hire such as, for example, a taxi, a peer-to-peer ride sharing service, or transportation service that charges fares for transporting a passenger from one location to another. The vehicle-for-hire service component 430 may provide, and/or assist with providing a map from a mapping service, to a vehicle-for-hire (e.g., transportation service provider 402) relating to a request party (e.g., user 406).

In one aspect, the vehicle-for-hire service component 430, in association with the assignment component 440, may receive one or more transportation service requests from one or more users (e.g., user 406) over a selected time period and each transportation service request may include one or more parameters and preferences of the one or more users (e.g., user 406). The vehicle-for-hire service component 430, in association with the assignment component 440, may assign transportation service requests amongst various transportation service providers such as, for example, the transportation service provider 402 according to one or more transportation service request distribution models and one or more parameters and preferences for each of user such as, for example, user 406. In one aspect, the privacy protection component 420 may use a transportation service request distribution model to protects information relating to each of the transportation service providers (e.g., transportation service provider 402) and suggests a selected order for distributing one or more transportation service requests.

The machine learning component 450 may forecast transportation service request demands for the plurality of users over a selected period of time and estimate a number of transportation service providers required to service the forecasted number transportation service requests.

The machine learning component 450 may learn the parameters and preferences of the one or more users, learn transportation service request demand for the one or more users based on historical transportation service request data, and/or learn one or more contextual factors relating to a journey relating to the one or more transportation service requests, wherein the one or more contextual factors include traffic data, weather data, road conditions, road types, or a combination thereof.

The vehicle-for-hire service component 430 may suggest both the selected order for distributing the plurality of transportation service requests and a minimum number of the transportation service providers for servicing the one or more transportation service requests (e.g., transportation service provider 402). The vehicle-for-hire service component 430 may maintain a degree of fairness between the plurality of transportation service providers for servicing the one or more transportation service requests over a selected period of time. Also, in an additional aspect, the vehicle-for-hire service component 430 may maintain a degree of fairness between the plurality of transportation service providers for servicing the one or more transportation service requests over a selected period of time by prioritizing the one or more parameters and preferences of the one or more users and minimizing transportation related time and costs.

The machine learning component 450 may collect and/or learn one or more user preferences, vehicle-for-hire parameters, one or more events, activities of daily living (ADL), and/or other events associated with a user. One or more machine learning modules may be developed, learned, and/or or built for providing one or more functions of the intelligent transportation service brokering system 410 such as, for example, one or more transportation service request distribution models. For example, the machine learning component 450 may apply multiple combinations of factors, parameters, user preferences, ADLs of the user, travel preferences, travel data (e.g., ride sharing data), shopping preferences, behavior characteristics, vehicle operator profiles, vehicle operation or behavior standards/values, learned behavior parameter data, temperature data, historical data, traffic data, weather data, road conditions, a health state of the operator, biometric data of the operator, longitudinal position data, latitudinal position data, longitudinal/latitudinal position data and/or other contextual in relation to the vehicle, or a combination thereof to the machine learning model for intelligent privacy protection transportation operations.

For example, the machine learning component 450 may cognitively predict, estimate and/or provide the approximate location within a selected location of the user 406. In one aspect, the machine learning component 450 may collect feedback information from the UE 406 and/or the transportation service provider 402 to learn, identify, and/or predict one or more privacy protection parameters, user preferences, and/or events (documented and/or undocumented) relating to a user for intelligent privacy protection brokering services using the intelligent transportation service brokering system 410. The machine learning component 450 may also learn and/or suggest the privacy protection factors for each user according to a user profile, behavior patterns, preferences, feedback, etc.

In one aspect, the machine learning operations of the machine learning component 450, as described herein, may be performed using a wide variety of methods or combinations of methods, such as supervised learning (e.g., MCMC filters, Kalman filters, particle filters, etc.), unsupervised learning, temporal difference learning, reinforcement learning and so forth. That is, the machine learning modeling may learn parameters of one or more physical models. The machine learning modeling may be employed in the category of parameter estimation of state space models, which may be completed by unsupervised learning techniques, particularly to learn the context and/or the indicators.

Some non-limiting examples of supervised learning which may be used with the present technology include Kalman filters, particle filters, MCM filters, AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Additionally, the computing system 12/computing environment of FIG. 4 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
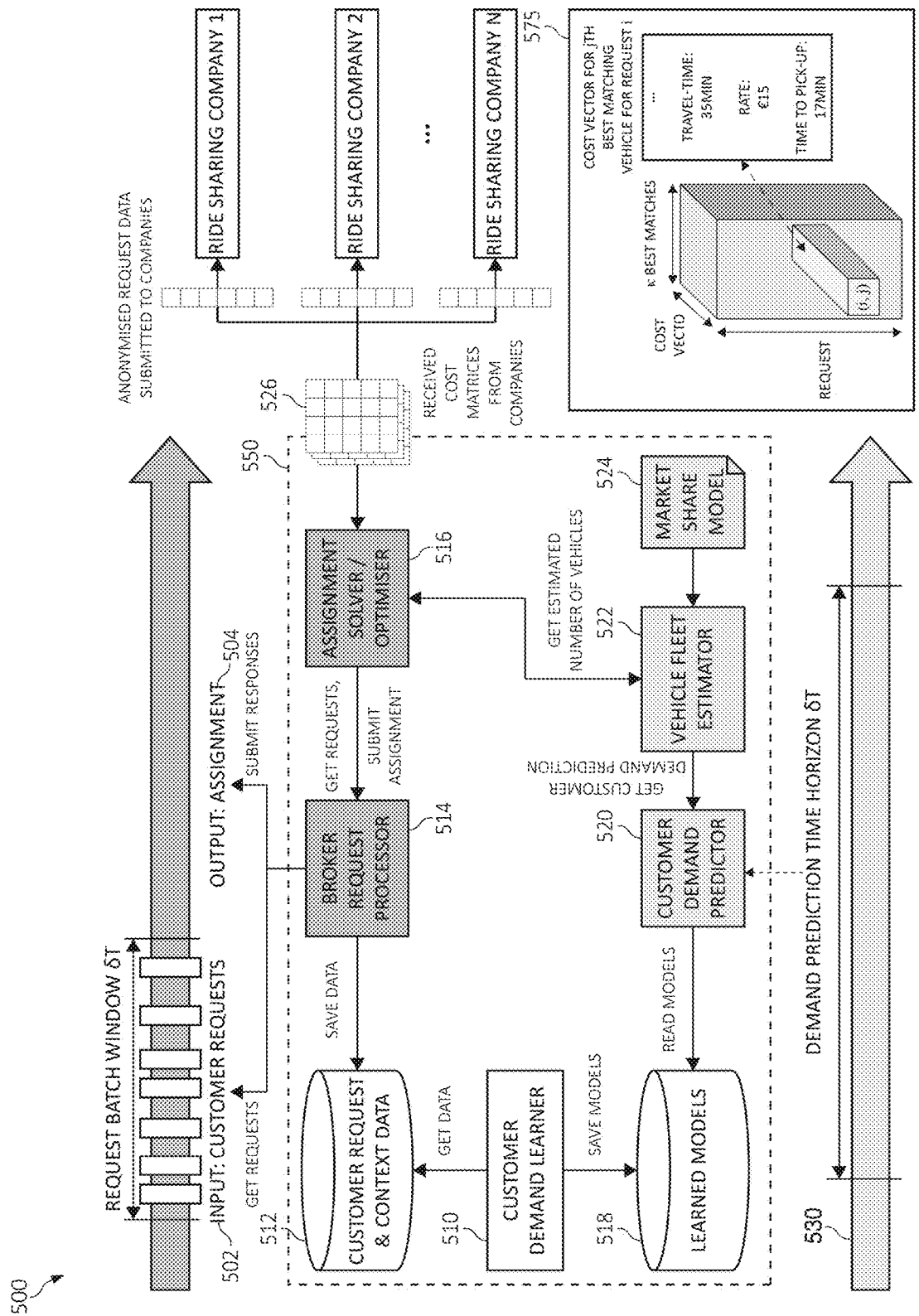
FIG. 5 is a block diagram of providing on-demand management of ride sharing in a transportation system in accordance with aspects of the present invention.

Turning now to FIG. 5, a block diagram of exemplary functionality for providing on-demand management of ride sharing in a transportation system is depicted, for use in the overall context of intelligent transportation service brokering system 550 (e.g., the intelligent transportation service brokering system 410 of FIG. 4) according to various aspects of the present invention. As shown, the various blocks of functionality are depicted with arrows designating the blocks' 500 relationships with each other and to show process flow. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for sake of brevity.

Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for providing on-demand management of ride sharing in a transportation system in accordance with the present invention. Many of the functional blocks' 500 may execute as background processes on various components, either in distributed computing components, or on the user device, or elsewhere.

In one aspect, the intelligent transportation service brokering system 550 may include a customer demand learner 510, customer request and context data 512, learned models 518, a broker request processor 514, an assignment component 516, a customer demand predictor 520, a vehicle fleet estimator 522, and a market share model 524. The intelligent transportation service brokering system 550 may in communication with one or more transportation service provider, such as, for example, ride-sharing company 1, ride-sharing company 2 and ride-sharing company N.

In one aspect, the customer demand learner 510 may learn one or more models 518 (e.g., "learned models" such as, for example, customer demand models) for a prediction of customer demand. The customer demand learner 510 may use customer request and context data 512 (e.g., historical customer requests, historical context data associated with the customer requests (e.g., weather, events, time of the day, day of the week)). The output of the models learned by the customer demand learner 510 may include one or more prediction models (e.g., statistical models, neural networks), which may be achieved using time series operations, deep learning operations (e.g., recurrent neural network, long short-term memory "LSTM" networks, multi-layer perceptron networks), etc.

A customer demand predictor 520 may, for a selected period of time (e.g., a given time horizon such as, for example, the next 6 hours), predict a customer demand 530 (e.g., demand prediction over a time window/horizon of length $\delta T$) for ride sharing services. The customer demand predictor 520 may use as input data a prediction time horizon, one or more learned models 518 (e.g., one or more customer demand prediction models learned from the customer demand learner 510), current context data (e.g., time of the day, day of the week, weather, today's events), current and previous customer demand data. The customer demand predictor 520 may generate as output a customer demand forecast (or prediction) over the selected time period (e.g., the input time horizon), which may be achieved using time series operations, deep learning operations (e.g., recurrent neural network, long short-term memory "LSTM" networks, multi-layer perceptron networks), etc.

A vehicle fleet estimator 522 may, based on the customer demand forecast generated from the customer demand predictor 520 and one or more market share model (e.g., transportation service request distribution models), estimate a minimal number of operating vehicles per transportation service provider, such as, for example, ride-sharing company 1, ride-sharing company 2 and ride-sharing company N to establish a degree of fairness of the vehicle assignment. The vehicle fleet estimator 522 may use as input data a prediction time horizon, the predicted customer demand from the customer demand predictor 520, and each market share model 524 received from each of the per transportation service provider, such as, for example, ride-sharing company 1, ride-sharing company 2 and ride-sharing company N.

The market share model 524 may be a function that determines the percentage of total operating fleet (e.g., fleet of vehicles) to be allocated to each participating transportation service provider, such as, for example, ride-sharing company 1, ride-sharing company 2 and ride-sharing company N and which may be proportional to a number of licenses issued by a legal or administrative authority to each transportation service provider.

For example, if three transportation service providers such as, for example, ride-sharing company 1, ride-sharing company 2 and ride-sharing company N are involved, and they own respectively 30, 15 and 5 licenses, then they market shares may be respectively 60%, 30%, and 10%. The market share model 524 generate an output that provides a minimal number of operating vehicles per ride sharing company over the input time horizon. Based on the predicted customer demand via the customer demand predictor, the vehicle fleet estimator 522 may estimate the minimal total number of operating vehicles needed, which may be achieved by offline learning of the number of vehicles needed to satisfy 100% service rate for a given estimated number of requests. Based on the total number of vehicles and on the market share model 524, the vehicle fleet estimator 522 may suggest a minimal number of operating vehicles per transportation service provider, such as, for example, ride-sharing company 1, ride-sharing company 2 and ride-sharing company N, which may be based on a model where the suggested number of vehicles for each transportation service provider is proportional to the market share of the transportation service provider.

In one aspect, one or more ride service requests 502 may be received (as input) via the broker request processor 514, where the ride service requests 502 may be a request batch over a selected period of time (e.g., time windows of length ST). That is, the one or more ride service requests 502 (e.g., customer requests) may be pre-processing by split real-time customer requests into batches over the predefined and selected period of time (e.g., time windows of length $\delta T$) and prepare the relevant request data for the other system components (assignment component, historical database, etc.).

The one or more ride service requests 502 may be a real-time customer request stream/log over predefined and selected period of time (e.g., time windows of length $\delta T$). The one or more ride service requests 502 may be processed via the broker request processor 514 to generate/output a batch of pre-processed anonymous requests including an anonymized identifier ("ID"), pick-up and drop-off locations and times, and one or more customer preferences (e.g., type of vehicle, preference as to whether to share ride with other passengers or not, etc.).

The one or more ride service requests 502 may be associated and stored with the customer request and context data 512 via the broker request processor 514. In one aspect, the broker request processor 514 may extract any relevant non-private information from the one or more ride service requests 502 (e.g., ride sharing requests) and submit the one or more ride service requests 502 to the assignment component 516 (e.g., assignment solver/optimizer) and may group one or more similar requests for inputs to the assignment component 516 (e.g., requests from passengers travelling from a similar origin to similar destination and indicating a willing to share rides with other users). The broker request processor 514 may join the one or more ride service requests 502 with context data and save as the customer request and context data 512.

The assignment component 516 may receive one or more cost matrices 526 from one or more transportation service provider, such as, for example, ride-sharing company 1, ride-sharing company 2 and ride-sharing company N. That is, one or more cost vectors received from the transportation service provider may be used to assign one or more transportation service requests amongst the transportation service providers according to a degree of fairness while maintaining protected data of the transportation service providers.

The assignment component 516 may dispatch one or more anonymized ride sharing requests to one or more transportation service provider and may then receive costs matrices (which may be anonymized) associated with one or more top/best k ride sharing options for each ride service request 502. The assignment component 516 may calculate/determine an optimum assignment by solving a linear assignment problem. Thus, the assignment component 516 may output 504 one or more assignments for servicing the ride sharing requests by one or more transportation service providers.

The assignment component 516 may submit the anonymized ride service requests 502 to one or more transportation service provider, such as, for example, ride-sharing company 1, ride-sharing company 2 and ride-sharing company N. That is, the assignment component 516 may assign one or more vehicles from the various transportation service providers, such as, for example, ride-sharing company 1, ride-sharing company 2 and ride-sharing company N to the one or more ride service requests 502 in an optimal, privacy-aware, and fair way.

The assignment component 516 may use as input, the batch of pre-processed and anonymized customer requests (e.g., the ride service requests 502) to estimate a minimal number of vehicles per transportation service providers. The assignment component 516 may generate as output an optimal assignment of vehicles to the ride service requests 502 by submitting the anonymized request data (from the batch) to the transportation service providers, such as, for example, ride-sharing company 1, ride-sharing company 2 and ride-sharing company N.

Each transportation service provider may match the requests against the locations of the transportation service provider's fleet of vehicles and returns a (user-centric) cost vector for each of the k best/optimal ride sharing service request matches. The result may be a cost matrix/tensor 575, where each request or combination of similar requests (row) may be associated with the cost vectors associated with the best k assignments, as illustrated in FIG. 5, depicting a cost matrix/tensor received from the ride sharing service of FIG. 4-5. The cost vector may include, for example, an indicated pick-up time, a route time to destination, rate (e.g., monetary value associated with a customer request and/or a rate may be considered as the routing time to reach the customer), deviation from user preferences, etc. The assignment component 516 may perform a linear assignment using the distributed auction algorithms that solves a linear assignment problem to optimality in a privacy-aware fashion.

It should be noted that the assignment component 516 does not require complete/full access to a $C_{ij}$ matrix of the costs. The assignment component 516 and/or the broker request processor 514 may orchestrate the cooperation between various transportation service providers, such as, for example, ride-sharing company 1, ride-sharing company 2 and ride-sharing company N via a distributed auction operation, where the auction bidding may be used to assist in providing the degree of fairness. In the distributed implementation, the entities engaged in the auction (i.e., the transportation ride sharing providers) may send to the assignment component 516 and/or the broker request processor 514 only the information needed to compute the bids B(i,j) of each proprietary vehicle i on the customer request j. Winning an iteration of the auction means having a vehicle assigned to a customer. The transportation service providers engaged in the auction having one or more unassigned vehicles may raise their bids in the next iteration, resulting in a decreased profit for the transportation service provider. After a finite or defined number of steps, the vehicles reach a condition of "almost-equilibrium", where there is no incentive for any transportation service provider to raise its bids. This condition corresponds to a feasible assignment of vehicles to requests, which is communicated to the companies by the broker. In other words, the cooperative protocol provides an assignment solution where no company has any incentive to unilaterally seek another user/customer (by bidding higher). The almost-equilibrium condition is formally expressed by equation 1, where M is a set of user ride sharing requests at time t, $C_i$ is each vehicle's capacity, $C_{ij}$ is each time duration of $R_{ij}$ where $R_{ij}$ is an optimal route of vehicle i, and B is a bid:

$$-C_{ij_i} - B(i, j_i) \geq \max_{j \in M}(-C_{ij} - B(i, j)) - \epsilon \ \forall \ i \in C, \qquad (1)$$

which ensures that each vehicle i serves a customer $j_i$ that is within $\epsilon$ (an sufficiently small constant) of the best current estimate of bid prices, C is a set of vehicles, and $\forall i \in C$ represents every vehicle i. It should be noted that, in this context, "profits" are expressed as assignment costs with opposite sign. In one aspect, the present invention does not require the vehicles to disclose their best prices with the assignment component 516 and/or the broker request processor 514, but rather, only the bids are disclosed. Specifically, in order to compute the bids at each iteration, the assignment component 516 and/or the broker request processor 514 needs to receive the difference between the two best rewards for the unassigned vehicles, and not the entire assignment cost matrix (as a centralized protocol would require).

To further illustrate, consider the following example for providing intelligent transportation service management in a transportation system by solving the ride sharing request assignment in a cooperative protocol with a degree of fairness. In the beginning, all vehicles of each of the transportation provides that are available are considered unassigned and the initial vehicle bids are set to zero. At each iteration, locally, each transportation service provider having an unassigned vehicle computes a difference between the two best possible net rewards obtained by serving (i.e., being assigned to) a user/customer. To participate in the auction, each transportation service provider having an unassigned vehicle i may raise its bid by a selected amount and the perturbation $\epsilon$ by a selected amount (i.e., a difference between the two best possible net rewards obtained by service a customer and the perturbation $\epsilon$). The perturbation is included to achieve almost-equilibrium condition. Vehicles assigned to users/customers in previous iterations do not need to update their bid. The bid prices may be collected by each transportation service provider and sent to the assignment component 516 and/or the broker request processor 514, which may assign each user/customer to the highest vehicle bidder/transportation service provider. The auction may continue until all vehicles of each transportation service provider are assigned or a maximum number of iterations is reached. The assignment returned by the auction operation needs to be interpreted for feasibility where the vehicles assigned to requests with infinite costs will not add the associated users/customers into their routes.

In one aspect, the assignment component 516 may have one or more properties: (1) a privacy aware property and (2) a degree of fairness property. For the privacy aware property, when forwarding one or more transportation service request to one or more transportation service providers, the assignment component 516 may forward one or more anonymous transportation service requests that do not disclose user/customer identity, an exact location of the user and/or transportation service provider, or full preferences (e.g., an entire list of customer preferences). In this way, only selected data required to compute an assignment cost is forwarded by the assignment component 516. When sending cost matrices/tensors from the transportation service providers to the transportation service request broker, the submitted matrices are anonymous in the sense that they do not disclose location of the user and/or transportation service provider or full cost information. Rather, the assignment component 516 only assigns the k best/optimal costs to the anonymous requests previously sent by the broker request processor 514.

For the degree of fairness property, the degree of fairness may be enforced the assignment module through the constraint of minimal number of vehicles per transportation service provider. The assignment component 516 may solve the following linear assignment problem using one or more decision variables which may be binary variables indicating the assignment of a request to a transportation service provider vehicle (e.g., matching one of the k costs in a cost matrix). One or more constraints may be used in the degree of fairness where every request may be assigned to a vehicle if it is feasible for the customer preferences and where only one assignment per request. In one aspect, a number of ride sharing requests may be assigned to each transportation service provider depends on (e.g., ≤) a minimal number of vehicles computed for that selected transportation service provider so as to minimize overall assignment cost and number of vehicles for all the assignments.

Figure 6:
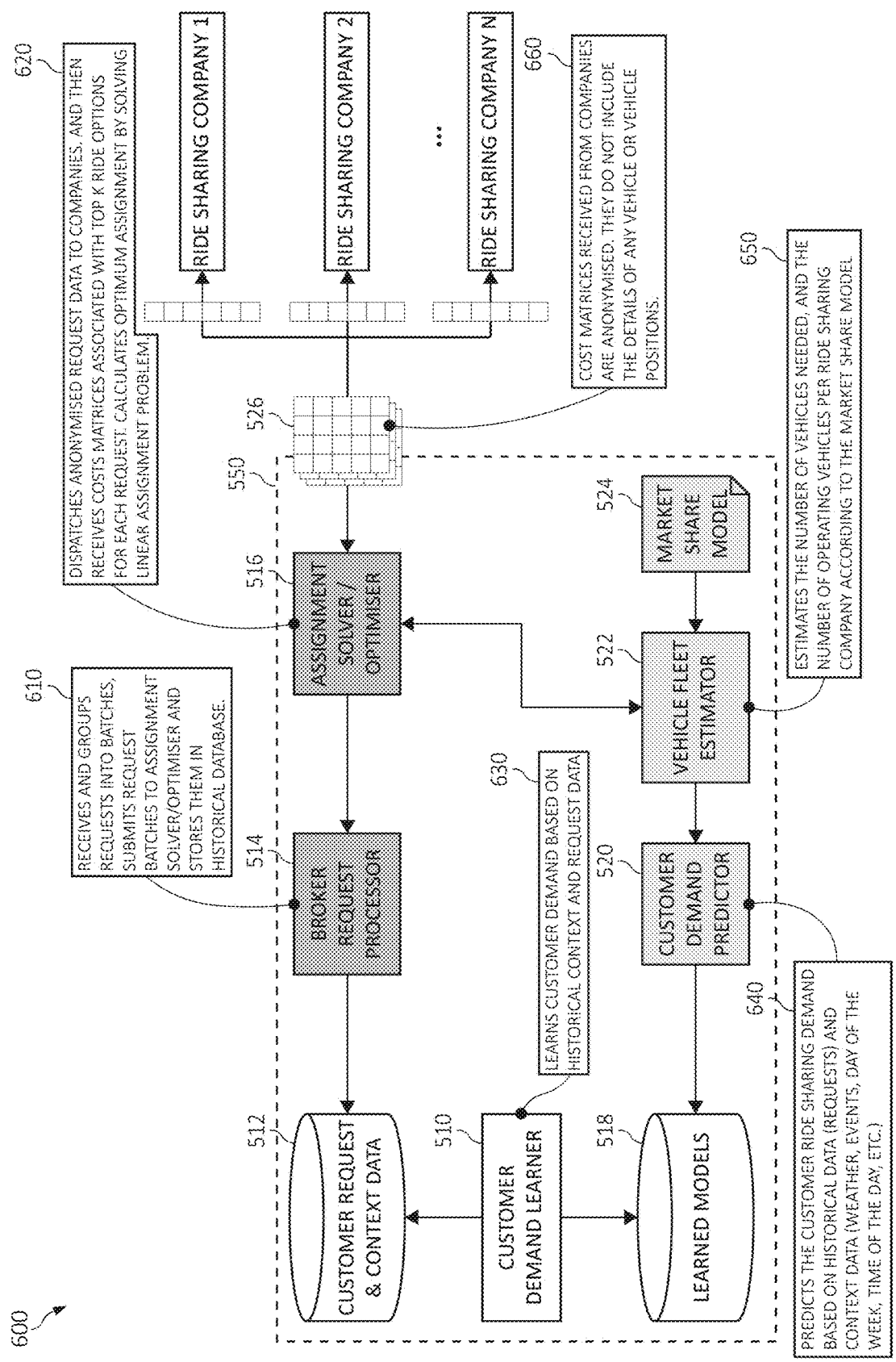
FIG. 6 is a block flow diagram of providing on-demand management of ride sharing in a transportation system in accordance with aspects of the present invention.

Turning now to FIG. 6, a block diagram of exemplary functionality 600 relating to providing on-demand management of ride sharing is depicted, for use in the overall context of providing the intelligent transportation service brokering systems of FIGS. 4 and 5 according to various aspects of the present invention. As shown, the various blocks of functionality are depicted with arrows designating the blocks' 600 relationships with each other and to show process flow. Additionally, descriptive information is also seen relating each of the functional blocks 600. As will be seen, many of the functional blocks may also be considered "modules" of functionality, in the same descriptive sense as has been previously described in FIGS. 4-5. With the foregoing in mind, the module blocks 600 may also be incorporated into various hardware and software components of a system for intelligent transportation service brokering systems in accordance with the present invention. Many of the functional blocks 600 may execute as background processes on various components, either in distributed computing components, or on the user device, or elsewhere, and generally unaware to the user performing generalized tasks of taking a picture with their camera (e.g., illustration 501).

Starting with block 610, one or more ride service requests ("requests") may be received and grouped into batches by the broker request processor 514. The batches may be submitted to the assignment component 516 (e.g., assignment solver/optimizer) and may be stored in a database.

In block 620, the assignment component 516 may dispatch one or more anonymized ride sharing requests to one or more transportation service provider and may then receive costs matrices (which may be anonymized) associated with one or more top/best k ride sharing options for each ride sharing request 502. The assignment component 516 may calculate/determine an optimum assignment by solving a linear assignment problem.

The customer demand learner 510 may learn customer demand based on historical context and transportation service request data, as in block 630. A customer ride sharing demand may be predicted by the customer demand predictor 520 based on the historical data (e.g., historical ride sharing requests) and contextual data (e.g., weather, events, time of day, day of the week/month, etc.), as in block 640.

The vehicle fleet estimator may estimate a number of vehicles needed to service one or more transportation service request in the batches and also estimate the number of operating vehicles per transportation service provider based on a market share model, as in block 650.

In block 660, one or more cost matrices, which may be received from one or more transportation service providers, may be anonymized (e.g., vehicle details, locations, and/or positions of a vehicle are protected).

Figure 7:
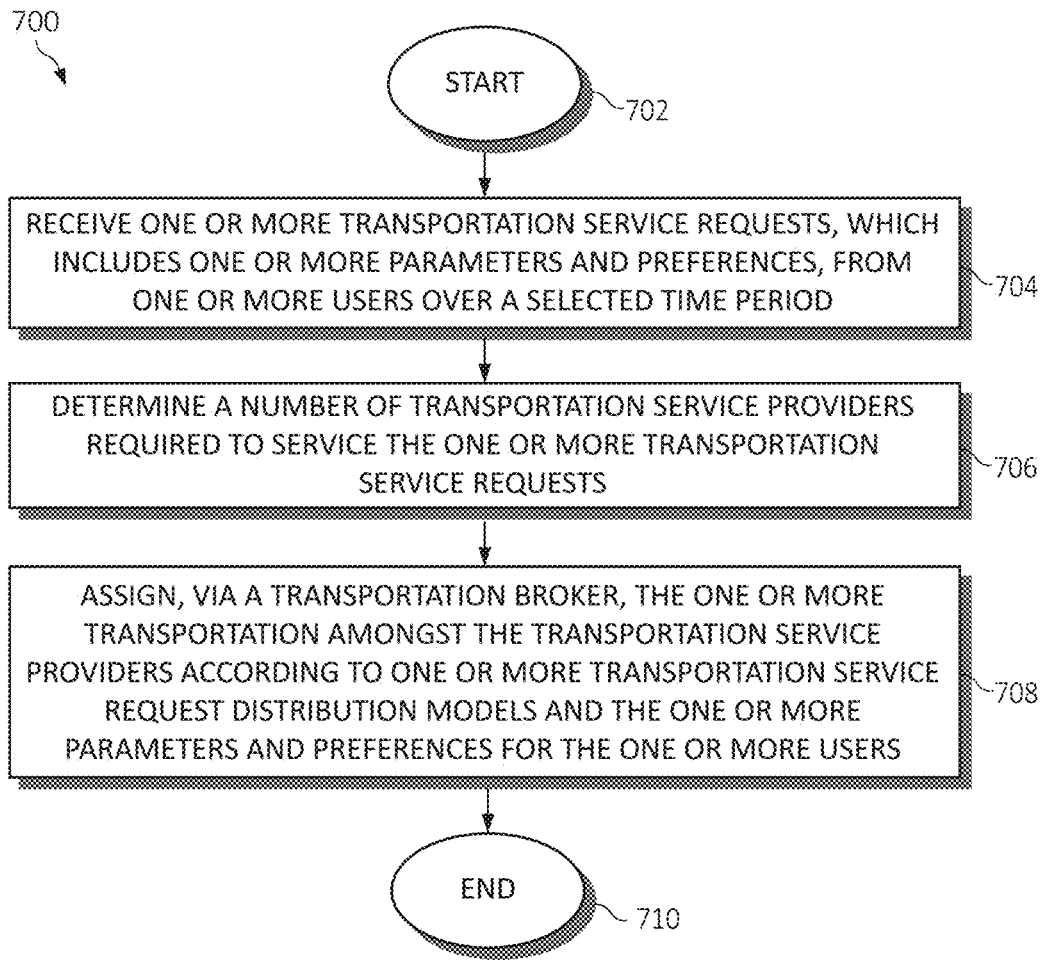
FIG. 7 is a flowchart diagram of an additional exemplary method for protecting privacy of entities in a transportation system by a processor in which various aspects of the present invention may be realized.

Turning now to FIG. 7, a method 700 for providing intelligent transportation service management in a transportation system (e.g., a vehicle-for-hire service, ride-sharing service) by a processor is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702.

One or more transportation service requests (e.g., for a vehicle-for-hire or ride-sharing service), which includes one or more parameters and preferences, may be received from one or more users over a selected time period, as in block 704. A number of transportation service providers required to service the one or more transportation service requests may be determined, as in block 706. One or more transportation service requests may be assigned amongst multiple transportation service providers according to one or more transportation service request distribution models and the one or more parameters and preferences for the one or mores, as in block 708. The transportation service request distribution models may protect information relating to each of the transportation service providers and suggests a selected order for distributing the plurality of transportation service requests. The functionality 700 may end, as in block 710.

Figure 8:
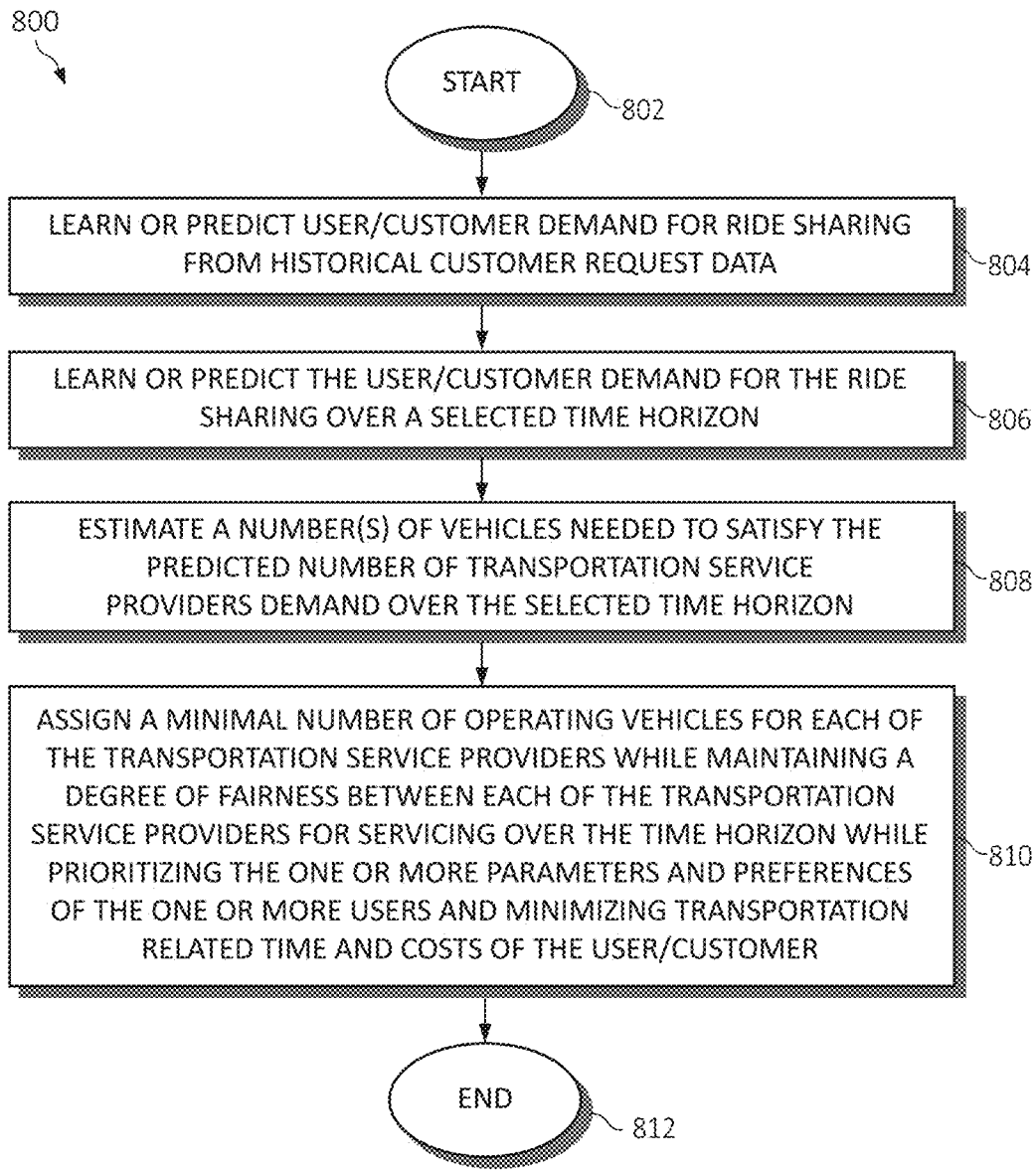
FIG. 8 is a flowchart diagram of an additional exemplary method for protecting privacy of entities in a transportation system by a processor, in which various aspects of the present invention may be realized.

Turning now to FIG. 8, a method 800 for providing intelligent transportation service management in a transportation system (e.g., a vehicle-for-hire service, ride-sharing service) by a processor is depicted, in which various aspects of the illustrated embodiments may be implemented. The functionality 800 may be implemented as a method executed as instructions on a machine, where the instructions are included on at least one computer readable medium or on a non-transitory machine-readable storage medium. The functionality 800 may start in block 802.

A user/customer demand for ride sharing may be learned and/or predicted from historical customer request data, as in block 804. The user/customer demand for the ride sharing may be learned and/or predicted over a selected time horizon, as in block 806. A number(s) of vehicles needed to satisfy the predicted number of transportation service providers demand over the selected time horizon may be estimated, as in block 808.

A minimal number of operating vehicles for each of the transportation service providers may be assigned while maintaining a degree of fairness between each of the transportation service providers for servicing over the time horizon while prioritizing the one or more parameters and preferences of the one or more users and minimizing transportation related time and costs of the user/customer, as in block 810. The functionality 800 may end, as in block 812.

In one aspect, in conjunction with and/or as part of at least one block of FIG. 7-8, the operations of 700 and/or 800 may include each of the following. The operations of 700 and/or 800 may receive one or more transportation service requests from one or more users over the selected time period, wherein each transportation service request includes one or more parameters and preferences of the one or more users.

The operations of 700 and/or 800 may predict/forecast transportation service request demands for the plurality of users over a selected period of time, and/or estimate a number of transportation service providers required to service the forecasted number transportation service requests.

The operations of 700 and/or 800 may learn the parameters and preferences of the one or more users, learn transportation service request demand for the one or more users based on historical transportation service request data, and/or learn one or more contextual factors relating to a journey relating to the one or more transportation service requests, wherein the one or more contextual factors include traffic data, weather data, road conditions, road types, or a combination thereof.

The operations of 700 and/or 800 may suggest both the selected order for distributing the plurality of transportation service requests and a minimum number of the transportation service providers for servicing the one or more transportation service requests, maintain a degree of fairness between the plurality of transportation service providers for servicing the one or more transportation service requests over a selected period of time, and/or maintain a degree of fairness between the plurality of transportation service providers for servicing the one or more transportation service requests over a selected period of time by prioritizing the one or more parameters and preferences of the one or more users and minimizing transportation related time and costs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing intelligent transportation service management in a transportation system, comprising:
   receiving, by the processor, a plurality of data representative of transportation service information associated with a plurality of transportation service providers and a plurality of users, wherein each of the transportation service providers are an independent ride sharing company having a plurality of vehicles-for-hire associated therewith;
   executing machine learning logic, by the processor, using a machine learning operation to generate one or more transportation service request distribution models according to the plurality of data, wherein executing the machine learning logic includes analyzing and correlating historical transportation service request data, one or more parameters and preferences for each of the plurality of users, and one or more contextual factors associated with a journey relating to a plurality of transportation service requests submitted by the plurality of users;
   assigning, by the processor via a transportation broker, the plurality of transportation service requests amongst the plurality of transportation service providers according to the one or more transportation service request distribution models and the one or more parameters and preferences of each of the plurality of users such that the transportation broker centralizes coordination of distribution of the transportation service requests amongst each independent ride sharing company, wherein the one or more transportation service request distribution models protect consumer and business information inclusive of business-specific vehicle identifications and proprietary pricing strategies relating to each of the plurality of transportation service providers and suggest a selected order for distributing the plurality of transportation service requests to the plurality of transportation service providers; and
   in conjunction with the assigning, assigning the plurality of transportation service requests amongst the plurality of transportation service providers in batches over a selected time period according to a distributed auction operation, wherein the distributed auction operation uses the transportation broker to iteratively relay one of the batches having a predetermined number of the transportation service requests to each of the transportation service providers, receive a top k number of offerings of bids for providing service from the transportation service providers for each iteration, perform the assigning of accepted offers of the plurality of transportation service requests, and require unassigned transportation service providers to raise the bids to lower a profit for the unassigned transport service providers during a subsequent iteration.

2. The method of claim 1, further including receiving the plurality of transportation service requests from the plurality of users over the selected time period, wherein each transportation service request includes the one or more parameters and preferences of a respective user of the plurality of users.

3. The method of claim 1, further including:
   forecasting transportation service request demands for the plurality of users over a selected period of time; and
   estimating a number of transportation service provider vehicles required to service the forecasted number transportation service requests.

4. The method of claim 1, further including:
   learning, by the machine learning operation, the parameters and preferences of the plurality of users;
   learning, by the machine learning operation, transportation service request demand for the plurality of users based on the historical transportation service request data; and
   learning, by the machine learning operation, the one or more contextual factors associated with the journey relating to the plurality of transportation service requests, wherein the one or more contextual factors include traffic data, weather data, road conditions, road types, or a combination thereof.

5. The method of claim 1, further including suggesting both the selected order for distributing the plurality of transportation service requests and a minimum number of the transportation service providers for servicing the plurality of transportation service requests.

6. The method of claim 1, further including maintaining a degree of fairness between the plurality of transportation service providers for servicing the plurality of transportation service requests over a selected period of time.

7. The method of claim 6, wherein maintaining the degree of fairness includes prioritizing the one or more parameters and preferences of the plurality of users and minimizing transportation related time and costs.

8. A system for providing intelligent transportation service management in a transportation system, comprising:
   one or more computers with executable instructions that when executed cause the system to:
      receive, by a processor executing the executable instructions, a plurality of data representative of transportation service information associated with a plurality of transportation service providers and a plurality of users, wherein each of the transportation service providers are an independent ride sharing company having a plurality of vehicles-for-hire associated therewith;
      execute machine learning logic, by the processor, using a machine learning operation to generate one or more transportation service request distribution models according to the plurality of data, wherein executing the machine learning logic includes analyzing and correlating historical transportation service request data, one or more parameters and preferences for each of the plurality of users, and one or more contextual factors associated with a journey relating to a plurality of transportation service requests submitted by the plurality of users;

assign, by the processor via a transportation broker, the plurality of transportation service requests amongst the plurality of transportation service providers according to the one or more transportation service request distribution models and the one or more parameters and preferences of each of the plurality of users such that the transportation broker centralizes coordination of distribution of the transportation service requests amongst each independent ride sharing company, wherein the one or more transportation service request distribution models protect consumer and business information inclusive of business-specific vehicle identifications and proprietary pricing strategies relating to each of the plurality of transportation service providers and suggest a selected order for distributing the plurality of transportation service requests to the plurality of transportation service providers; and in conjunction with the assigning, assign the plurality of transportation service requests amongst the plurality of transportation service providers in batches over a selected time period according to a distributed auction operation, wherein the distributed auction operation uses the transportation broker to iteratively relay one of the batches having a predetermined number of the transportation service requests to each of the transportation service providers, receive a top k number of offerings of bids for providing service from the transportation service providers for each iteration, perform the assigning of accepted offers of the plurality of transportation service requests, and require unassigned transportation service providers to raise the bids to lower a profit for the unassigned transport service providers during a subsequent iteration.

9. The system of claim 8, wherein the executable instructions further receive the plurality of transportation service requests from the plurality of users over the selected time period, wherein each transportation service request includes the one or more parameters and preferences of a respective user of the plurality of users.

10. The system of claim 8, wherein the executable instructions further:
forecast transportation service request demands for the plurality of users over a selected period of time; and
estimate a number of transportation service provider vehicles required to service the forecasted number transportation service requests.

11. The system of claim 8, wherein the executable instructions further:
learn, by the machine learning operation, the parameters and preferences of the plurality of users;
learn, by the machine learning operation, transportation service request demand for the plurality of users based on the historical transportation service request data; and
learn, by the machine learning operation, the one or more contextual factors associated with the journey relating to the plurality of transportation service requests, wherein the one or more contextual factors include traffic data, weather data, road conditions, road types, or a combination thereof.

12. The system of claim 8, wherein the executable instructions further suggest both the selected order for distributing the plurality of transportation service requests and a minimum number of the transportation service providers for servicing the plurality of transportation service requests.

13. The system of claim 8, wherein the executable instructions further maintain a degree of fairness between the plurality of transportation service providers for servicing the plurality of transportation service requests over a selected period of time.

14. The system of claim 13, wherein maintaining the degree of fairness includes prioritizing the one or more parameters and preferences of the plurality of users and minimizing transportation related time and costs.

15. A computer program product for providing intelligent transportation service management in a transportation system by a processor, the computer program product comprising a non-transitory computer-readable storage medium having computer-readable program code portions stored therein, the computer-readable program code portions comprising:

an executable portion that receives, by the processor, a plurality of data representative of transportation service information associated with a plurality of transportation service providers and a plurality of users, wherein each of the transportation service providers are an independent ride sharing company having a plurality of vehicles-for-hire associated therewith;

an executable portion that executes machine learning logic, by the processor, using a machine learning operation to generate one or more transportation service request distribution models according to the plurality of data, wherein executing the machine learning logic includes analyzing and correlating historical transportation service request data, one or more parameters and preferences for each of the plurality of users, and one or more contextual factors associated with a journey relating to a plurality of transportation service requests submitted by the plurality of users;

an executable portion that assigns, by the processor via a transportation broker, the plurality of transportation service requests amongst the plurality of transportation service providers according to the one or more transportation service request distribution models and the one or more parameters and preferences of each of the plurality of users such that the transportation broker centralizes coordination of distribution of the transportation service requests amongst each independent ride sharing company, wherein the one or more transportation service request distribution models protect consumer and business information inclusive of business-specific vehicle identifications and proprietary pricing strategies relating to each of the plurality of transportation service providers and suggest a selected order for distributing the plurality of transportation service requests to the plurality of transportation service providers; and an executable portion that, in conjunction with the assigning, assigns the plurality of transportation service requests amongst the plurality of transportation service providers in batches over a selected time period according to a distributed auction operation, wherein the distributed auction operation uses the transportation broker to iteratively relay one of the batches having a predetermined number of the transportation service requests to each of the transportation service providers, receive a top k number of offerings of bids for providing service from the transportation service providers for each iteration, perform the assigning of accepted offers of the plurality of transportation service requests, and require unassigned transportation service providers to raise the bids to lower a profit for the unassigned transport service providers during a subsequent iteration.

16. The computer program product of claim 15, further including an executable portion that receives the plurality of transportation service requests from the plurality of users over the selected time period, wherein each transportation service request includes the one or more parameters and preferences of a respective user of the plurality of users.

17. The computer program product of claim 15, further including an executable portion that:
  forecasts transportation service request demands for the plurality of users over a selected period of time; and
  estimates a number of transportation service provider vehicles required to service the forecasted number transportation service requests.

18. The computer program product of claim 15, further including an executable portion that:
  learns, by the machine learning operation, the parameters and preferences of the plurality of users;
  learns, by the machine learning operation, transportation service request demand for the plurality of users based on the historical transportation service request data; and
  learns, by the machine learning operation, the one or more contextual factors associated with the journey relating to the plurality of transportation service requests, wherein the one or more contextual factors include traffic data, weather data, road conditions, road types, or a combination thereof.

19. The computer program product of claim 15, further including an executable portion that suggests both the selected order for distributing the plurality of transportation service requests and a minimum number of the transportation service providers for servicing the plurality of transportation service requests.

20. The computer program product of claim 15, further including an executable portion that maintains a degree of fairness between the plurality of transportation service providers for servicing the plurality of transportation service requests over a selected period of time, wherein maintaining the degree of fairness includes prioritizing the one or more parameters and preferences of the plurality of users and minimizing transportation related time and costs.

\* \* \* \* \*